United States Patent
Hara et al.

(10) Patent No.: US 8,046,555 B2
(45) Date of Patent: *Oct. 25, 2011

(54) METHOD OF MIRRORING DATA BETWEEN CLUSTERED NAS SYSTEMS

(75) Inventors: Junichi Hara, Cupertino, CA (US); Manabu Kitamura, Cupertino, CA (US)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/957,680

(22) Filed: Dec. 1, 2010

(65) Prior Publication Data
US 2011/0072229 A1     Mar. 24, 2011

Related U.S. Application Data

(63) Continuation of application No. 12/258,500, filed on Oct. 27, 2008, now Pat. No. 7,865,681, which is a continuation of application No. 11/353,078, filed on Feb. 14, 2006, now Pat. No. 7,461,222.

(51) Int. Cl.
*G06F 12/00*     (2006.01)
(52) U.S. Cl. ........................................ 711/162
(58) Field of Classification Search .................. None
See application file for complete search history.

(56) References Cited

U.S. PATENT DOCUMENTS

| 6,356,941 | B1 | 3/2002 | Cohen |
| 6,529,944 | B1 | 3/2003 | LeCrone |
| 7,152,069 | B1 | 12/2006 | Santry et al. |
| 7,206,939 | B2 * | 4/2007 | Miyazaki et al. ............. 713/193 |
| 7,461,222 | B2 | 12/2008 | Hara et al. |
| 7,469,260 | B2 * | 12/2008 | Enko et al. ................... 711/100 |
| 2006/0129608 | A1 | 6/2006 | Sato et al. |
| 2007/0033341 | A1 | 2/2007 | Hashimoto et al. |
| 2007/0156506 | A1 | 7/2007 | Hara |

* cited by examiner

*Primary Examiner* — Hiep Nguyen
(74) *Attorney, Agent, or Firm* — Mattingly & Malur, PC

(57) ABSTRACT

Data of a global file system spread over multiple local NAS systems may be consolidated as a copy into a single remote NAS system. When remote copy is set up, the local NAS systems replace referrals within the global file system with directories and send these in place of the referrals to the remote NAS system. Then, other local NAS systems referred to by the referrals send files and directories under the directories replacing the referrals on the remote NAS system. Alternatively, to split copy data of a locally-stored global file system amongst multiple remote NAS systems, the local NAS system replaces specified directories with referrals, and sends the referrals with the data to one of the remote NAS systems. Then, the local NAS system sends files and directories under the directories replaced with referrals to one or more other remote NAS systems as referred to by the referrals.

18 Claims, 20 Drawing Sheets

Splitting a Global File System

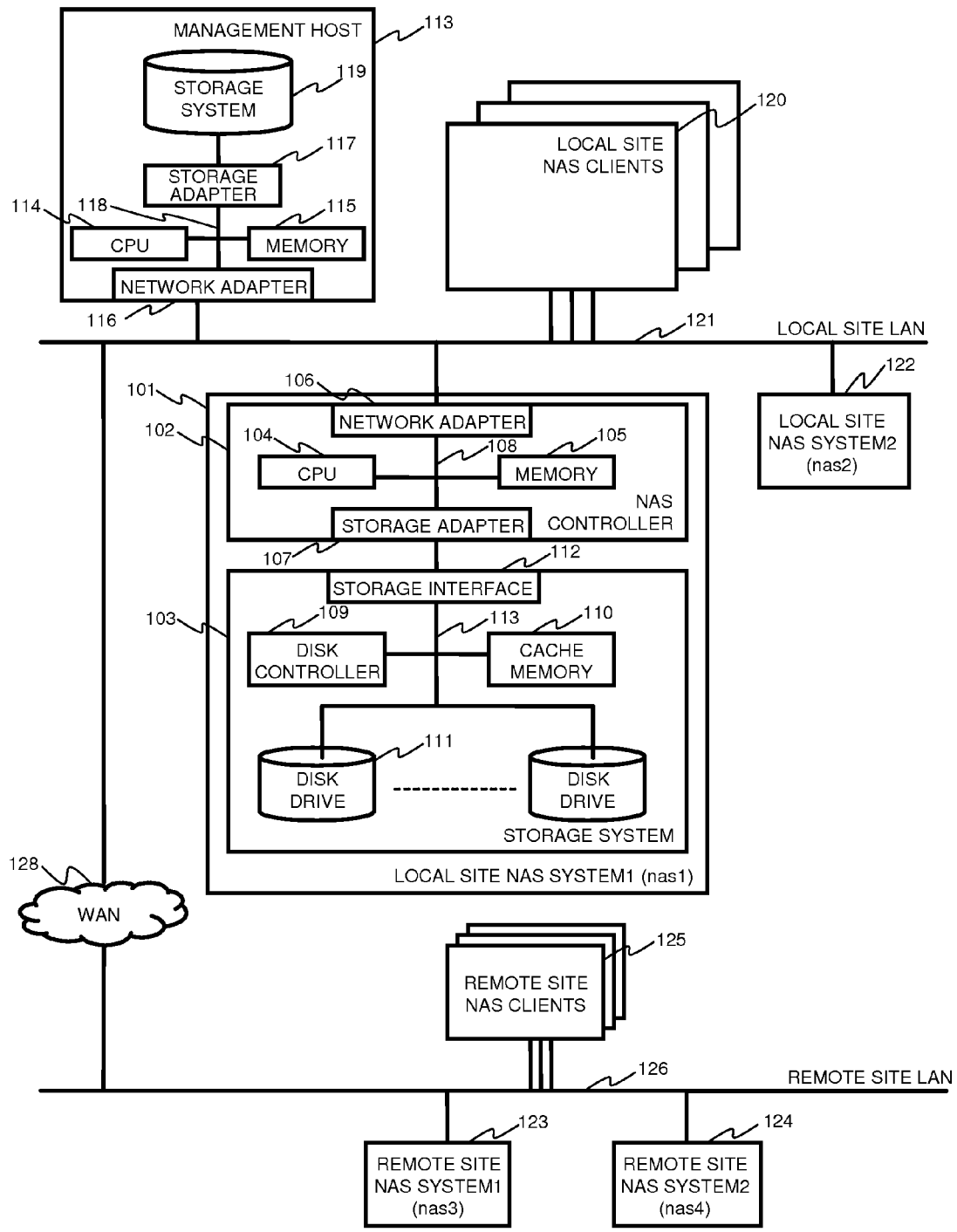
FIG. 1 System Configuration

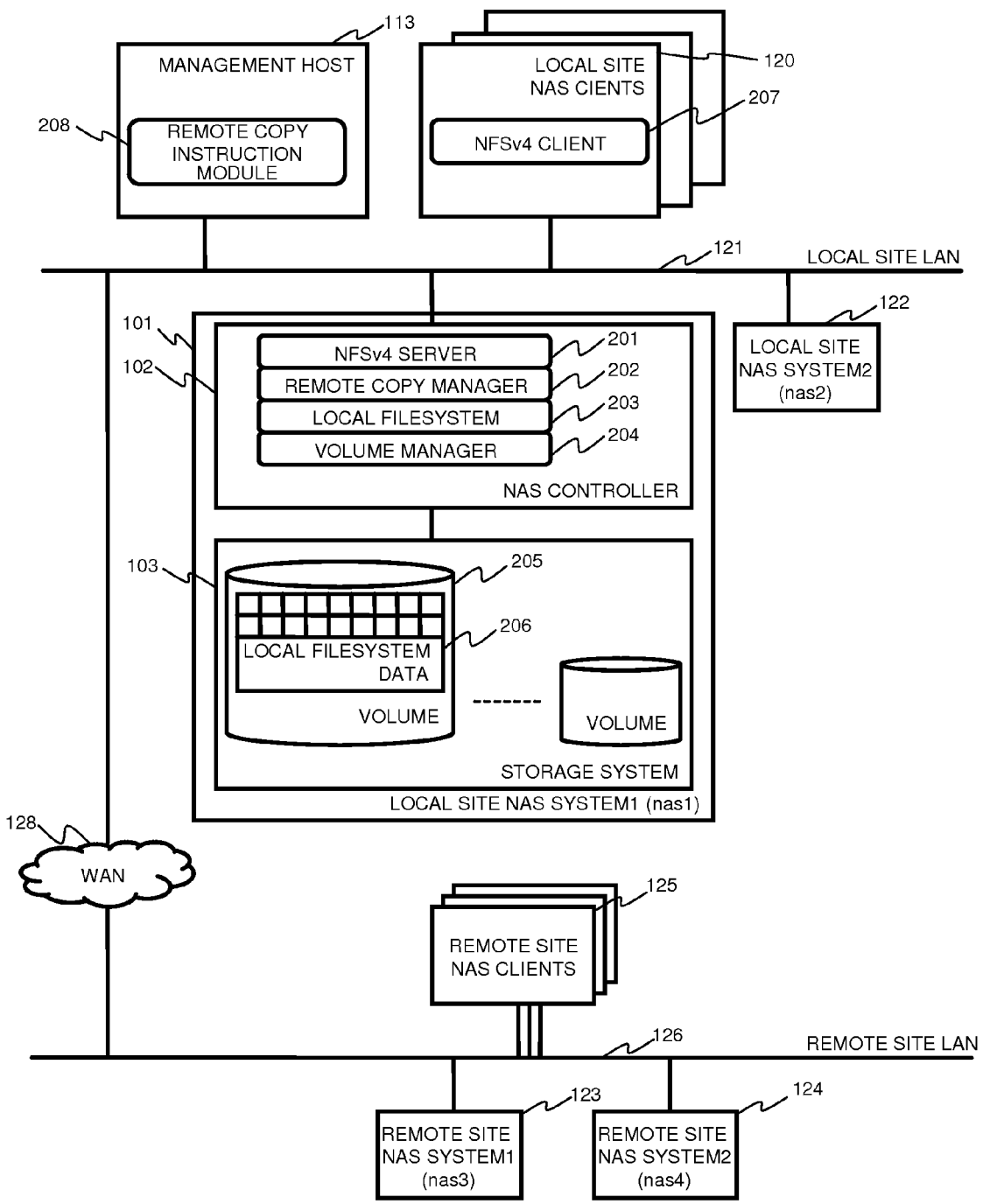
FIG. 2 Functional Diagram

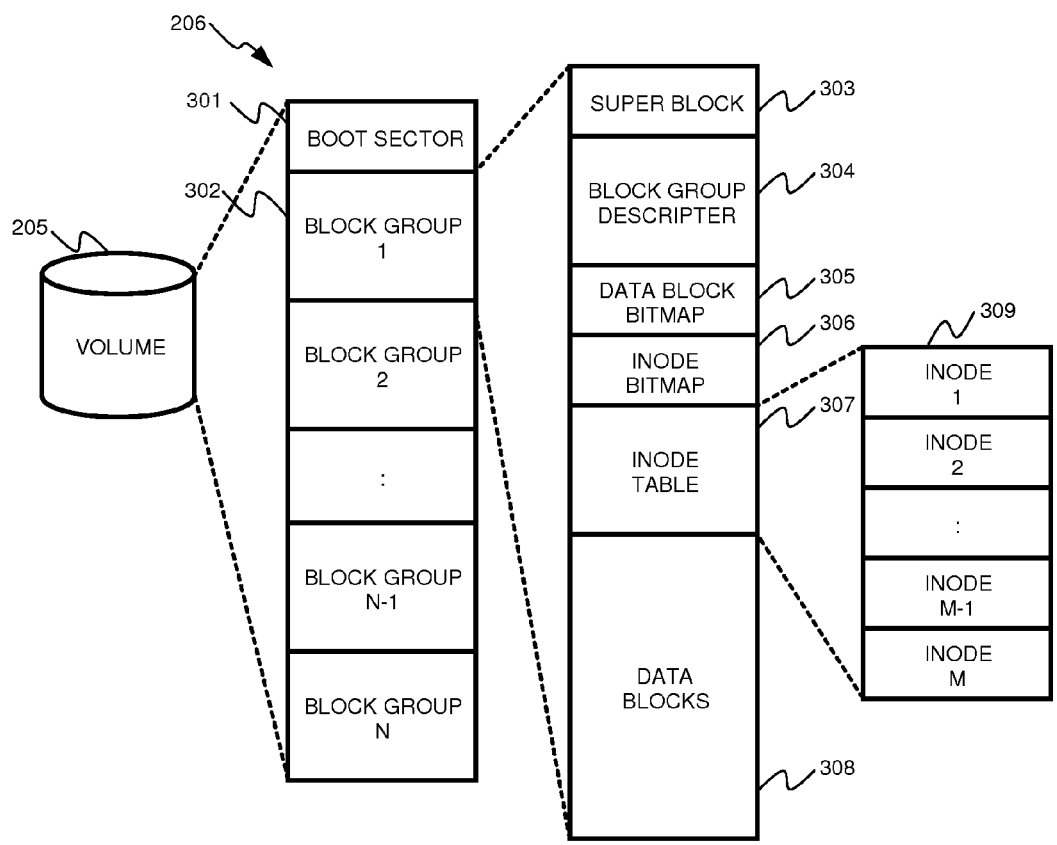
FIG. 3 Example Layout of File System Data

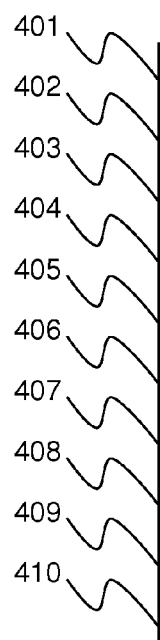
FIG. 4 Example of Inode Information

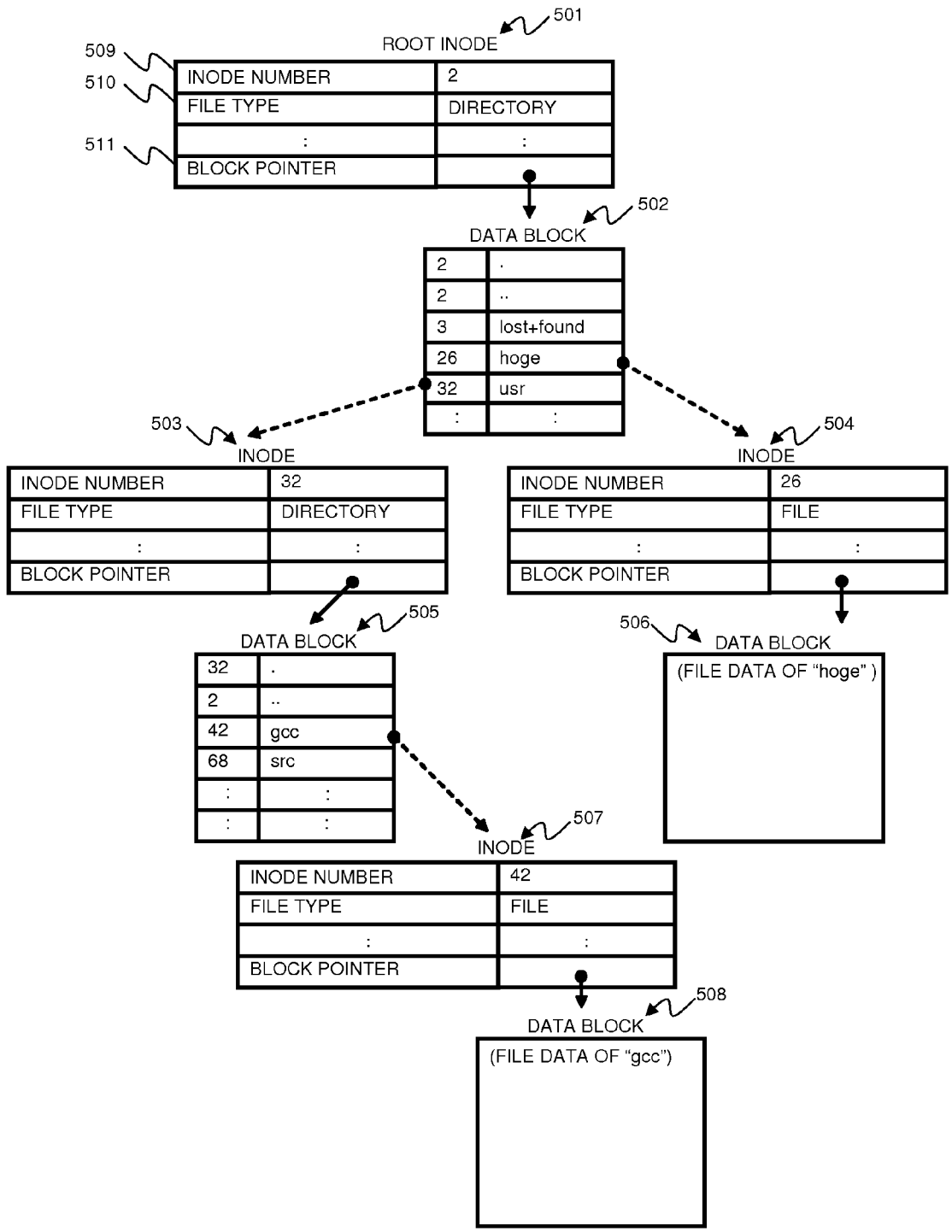
FIG. 5 Example of File System Structure

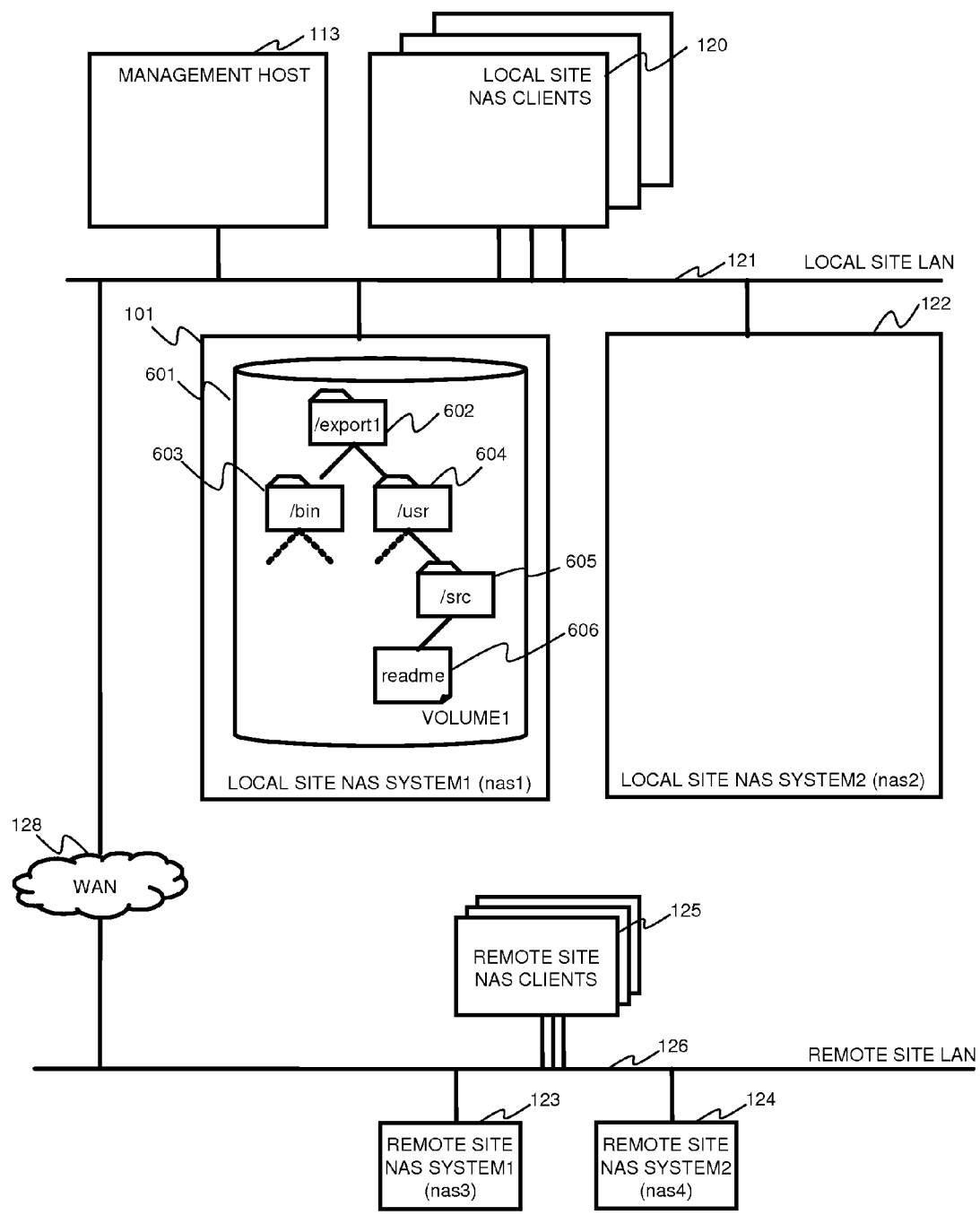
FIG. 6 Example of File Deployment

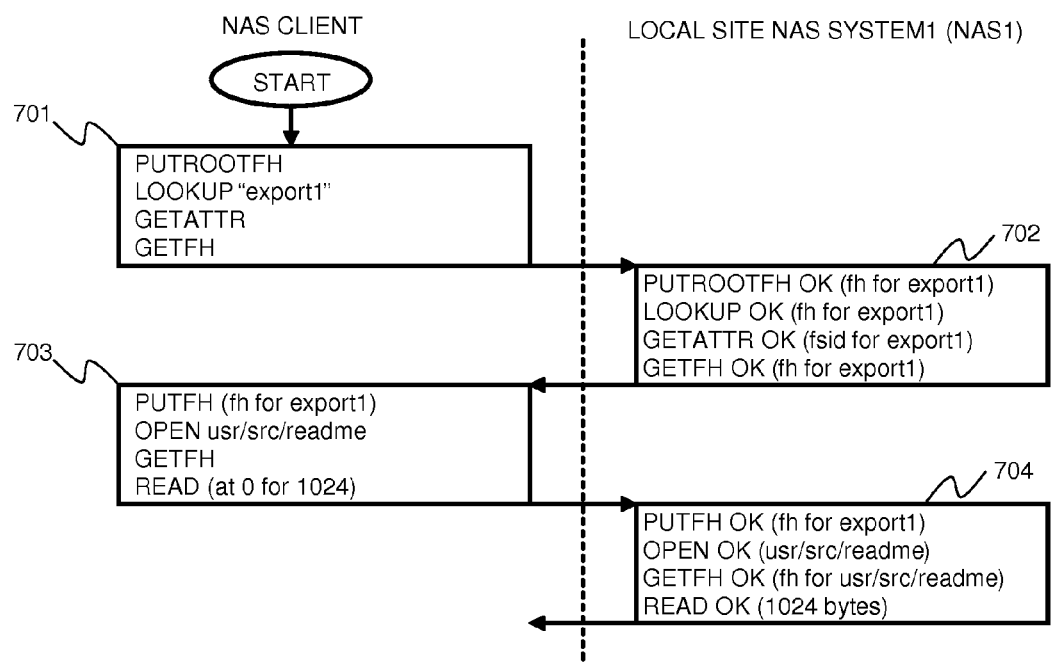
FIG. 7 Reading First 1KB of /export/src/readme via NFSv4

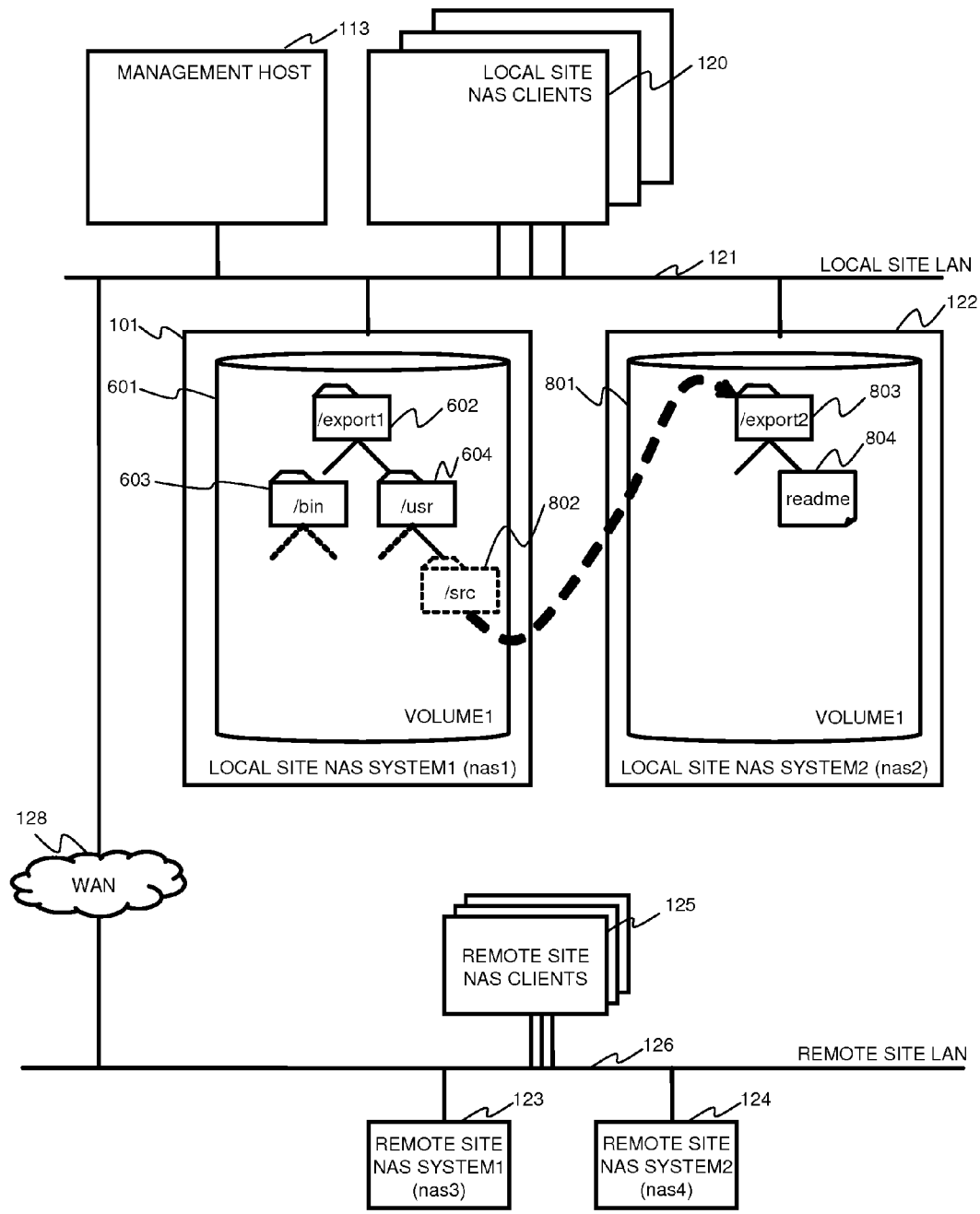
FIG. 8 In Case that "src" has been migrated to "/export2" on local site NAS system2

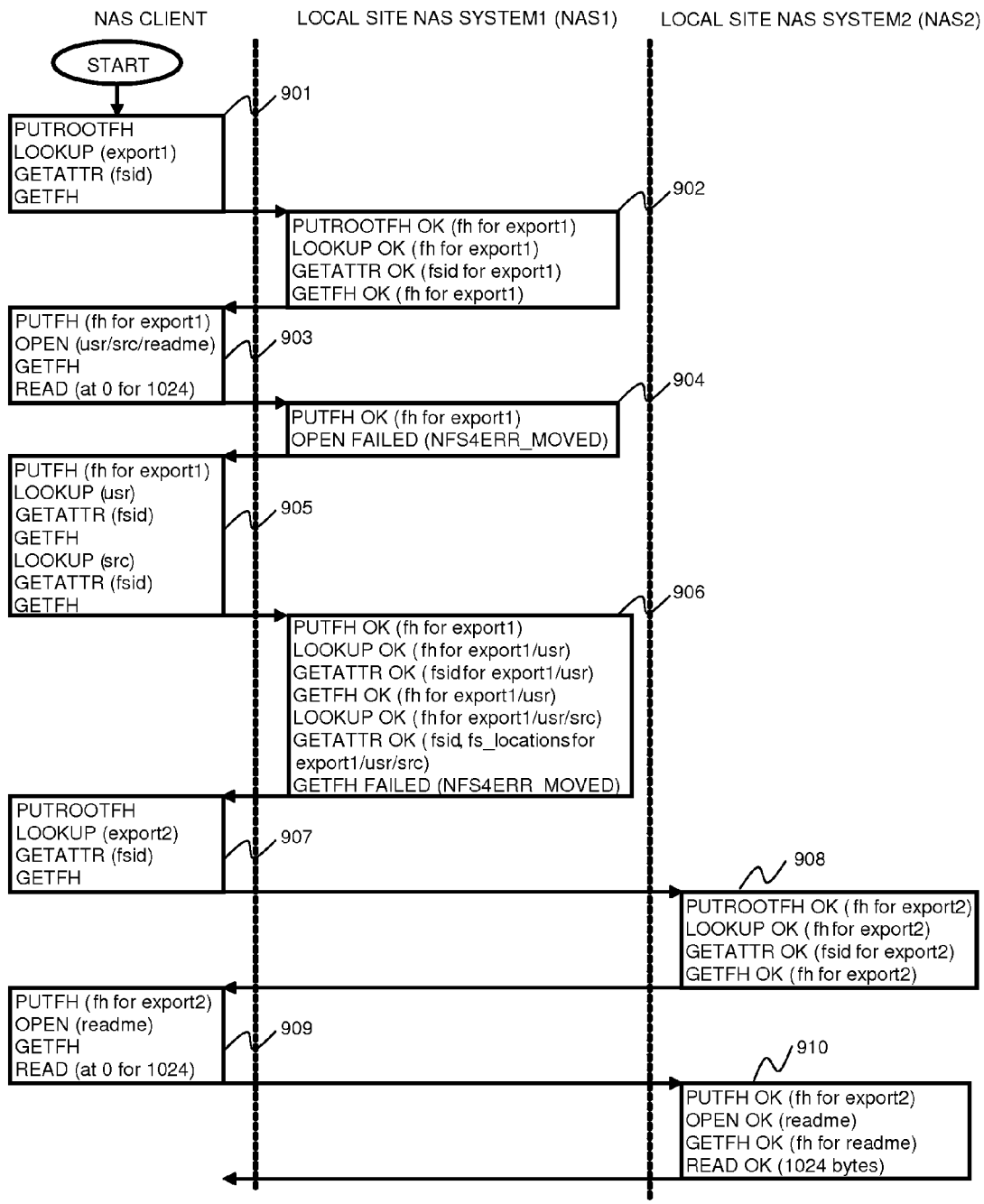
FIG. 9 In Case that "src" has been Migrated to "export2" on Local Site NAS System2

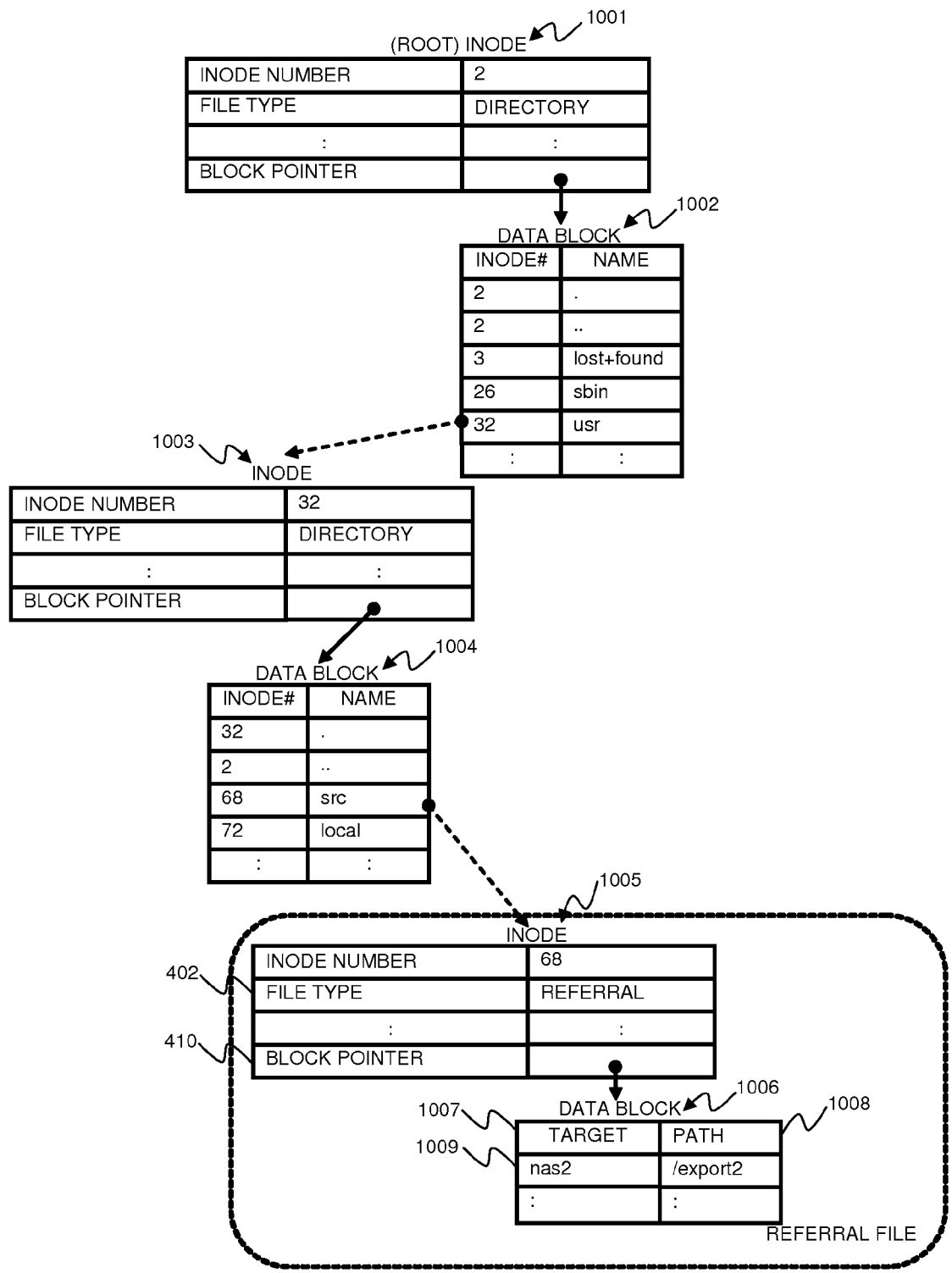
FIG. 10 Example of Referral File

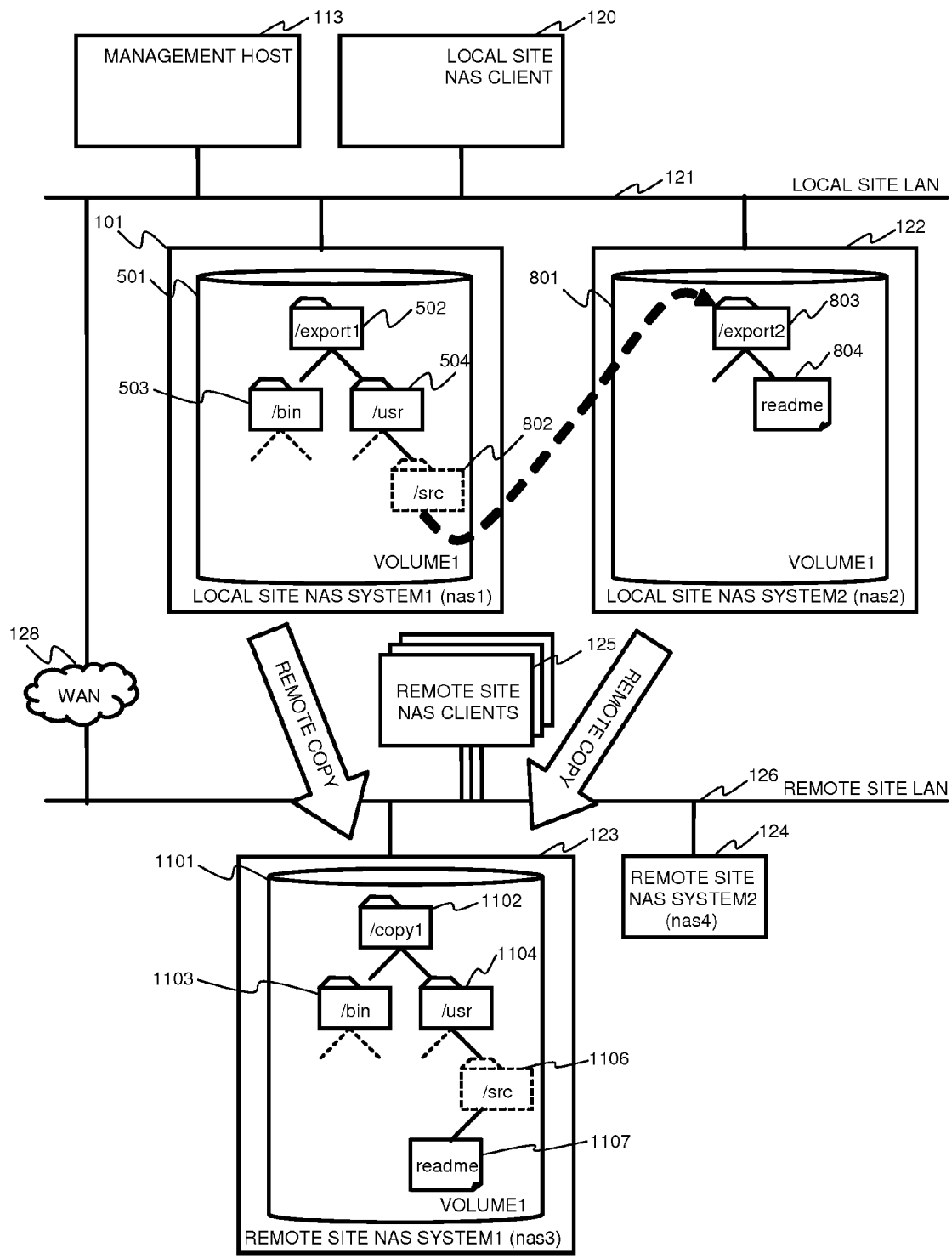
FIG. 11 Consolidating a Global File System

| 1201 | 1202 | 1203 | 1204 | 1205 |
|---|---|---|---|---|
| | NAME OF GLOBAL NAME SPACE | PATH IN GLOBAL NAME SPACE | TARGET | PATH |
| 1206 | gfs1 | / | nas1 | /export1 |
| 1207 | gfs1 | /usr/src | nas2 | /export2 |
| | : | : | : | : |
FIG. 12 Global Name Space Management Table
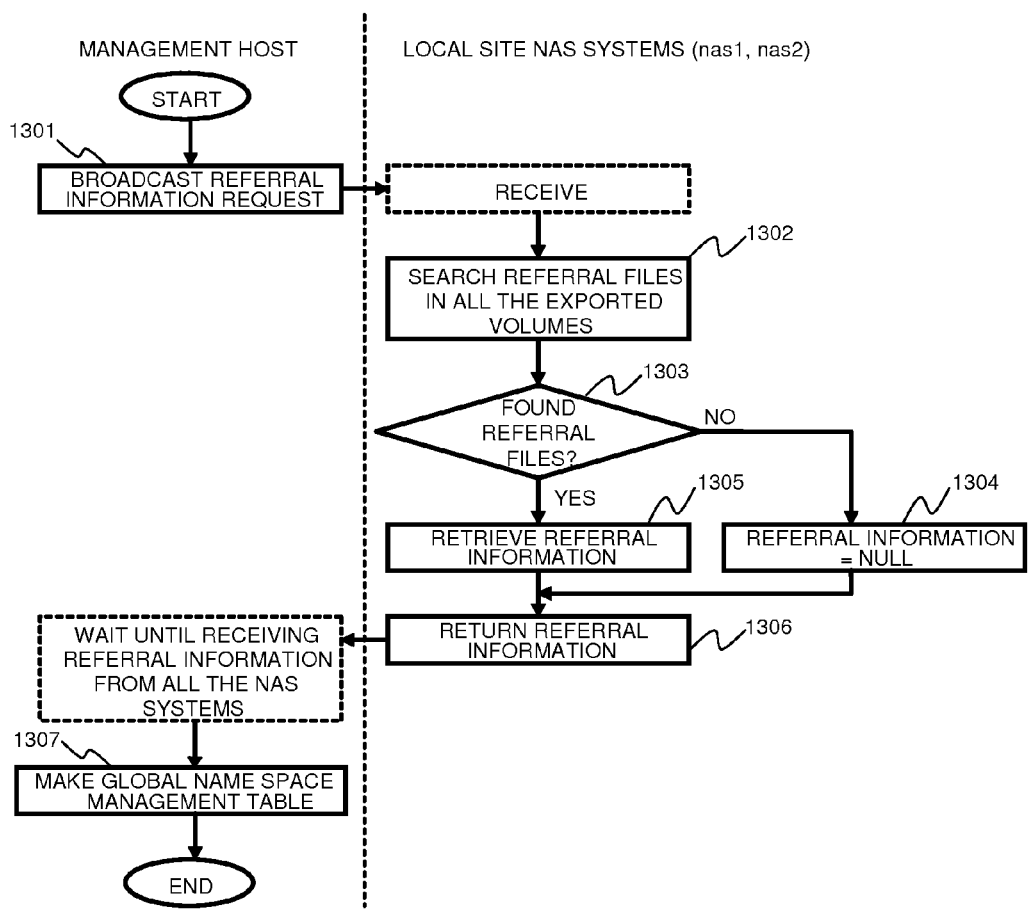
FIG. 13 Flow Diagram of Collecting Referral Information

| 1401 | 1402 OWN HOSTNAME | 1403 LOCAL EXPORTED DIRECTORY | 1404 LOCAL LOCATION OF REFERRAL FILE | 1405 REFFERAL TARGET HOSTNAME | 1406 REFERRAL TARGET PATH |
|---|---|---|---|---|---|
| 1407 | nas1 | /export1 | /export1/usr/src | nas2 | /export2 |
| 1408 | nas2 | /export2 | NULL | NULL | NULL |

FIG. 14 Referral Information that Local Site NAS Systems return to Management Host

| 1701 | 1702 SOURCE DIRECTORY | 1703 TARGET HOSTNAME | 1704 TARGET DIRECTORY | 1705 REFERRAL FILES TO BE REMOVED |
|---|---|---|---|---|
| 1706 | /export1 | nas3 | /copy1 | /export1/usr/src |
| 1707 | /export2 | nas3 | /copy1/usr/src | NULL |

FIG. 17 Information included in SETUP REMOTE COPY request to Local Site NAS Systems via Instruction Central Control for Consolidation

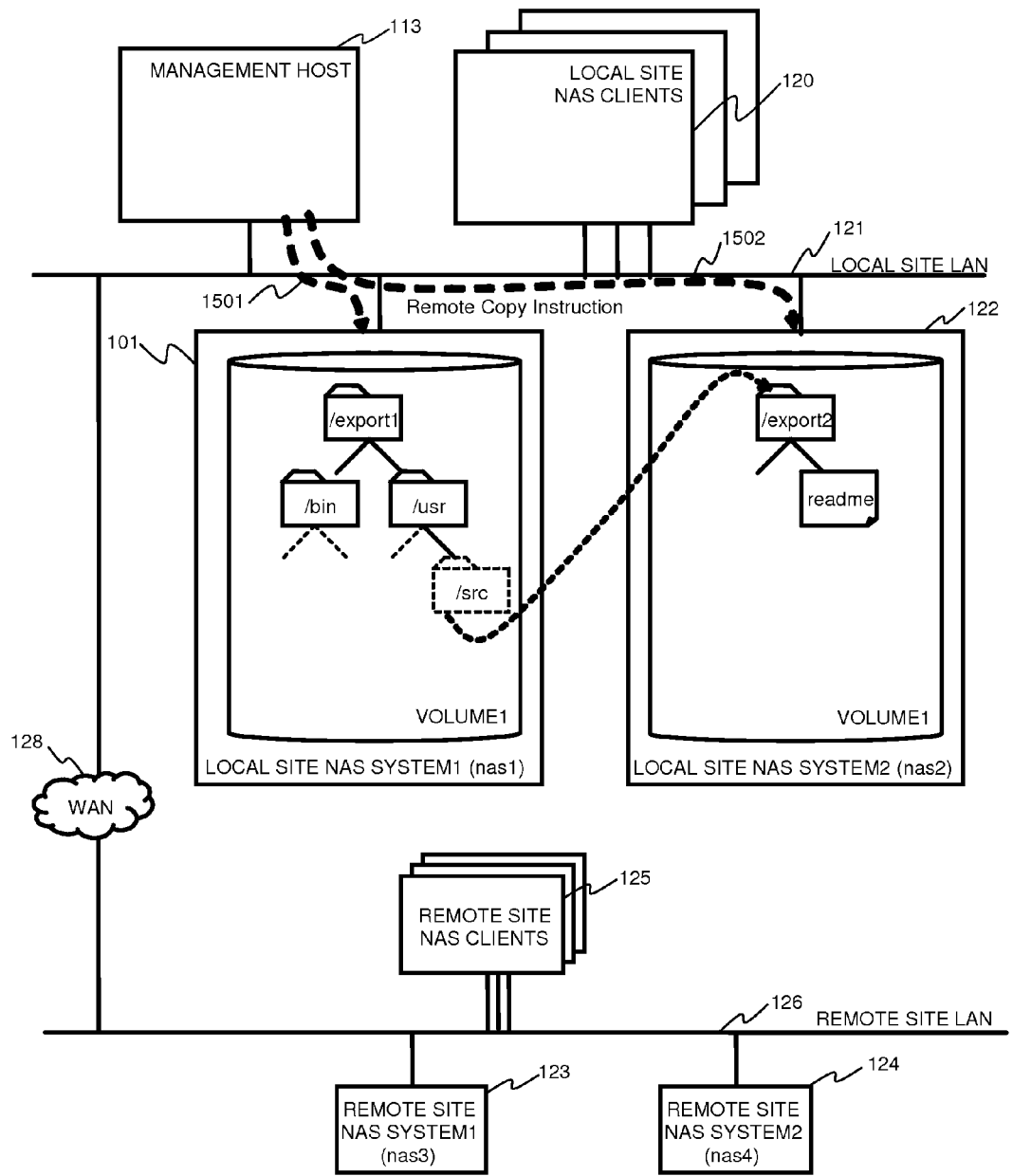
FIG. 15 Instructing to Set Up Remote Copy via Instruction Central Control

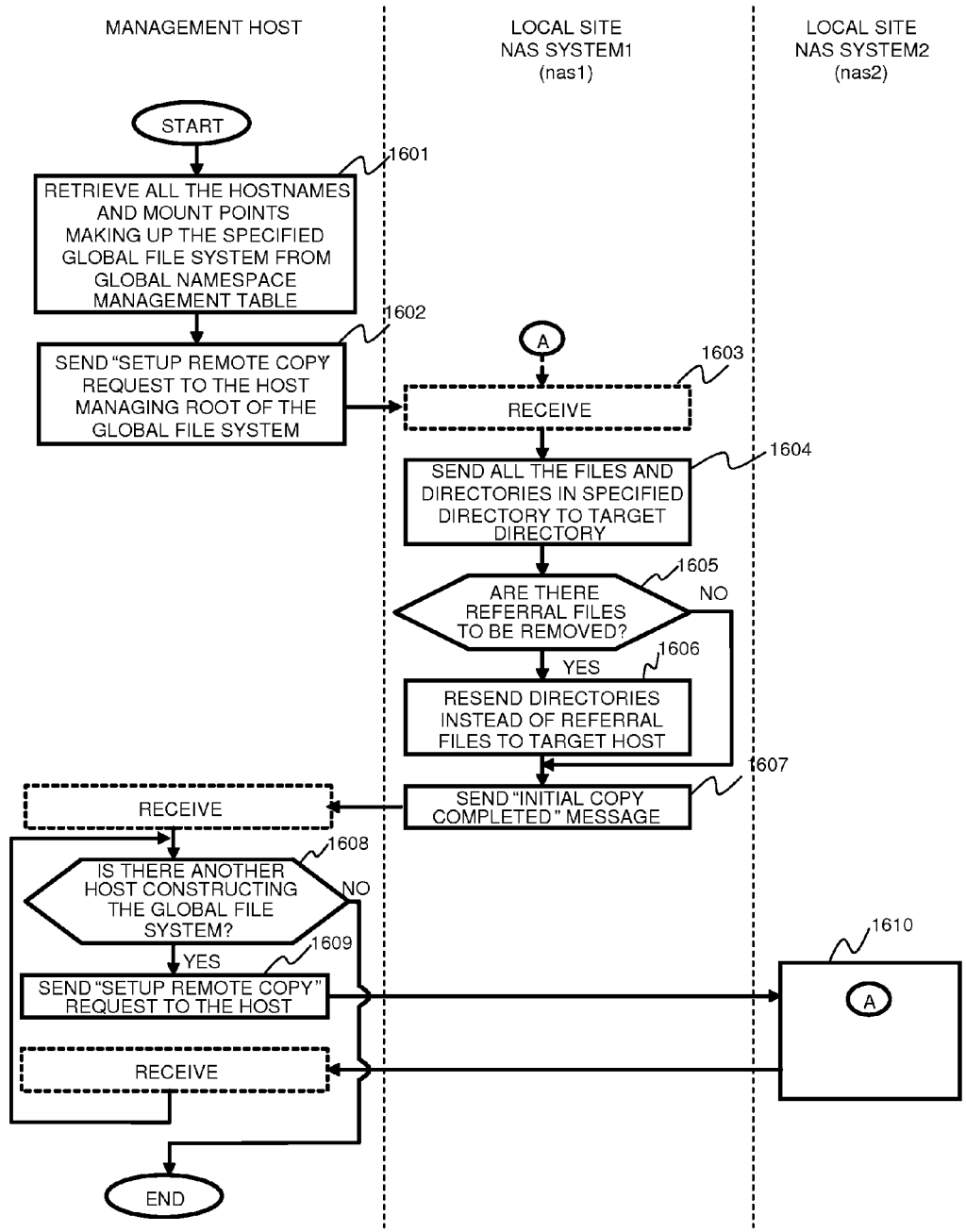
FIG. 16 Flow Diagram of Setting Up Remote Copy via Instruction Central Control for Consolidation

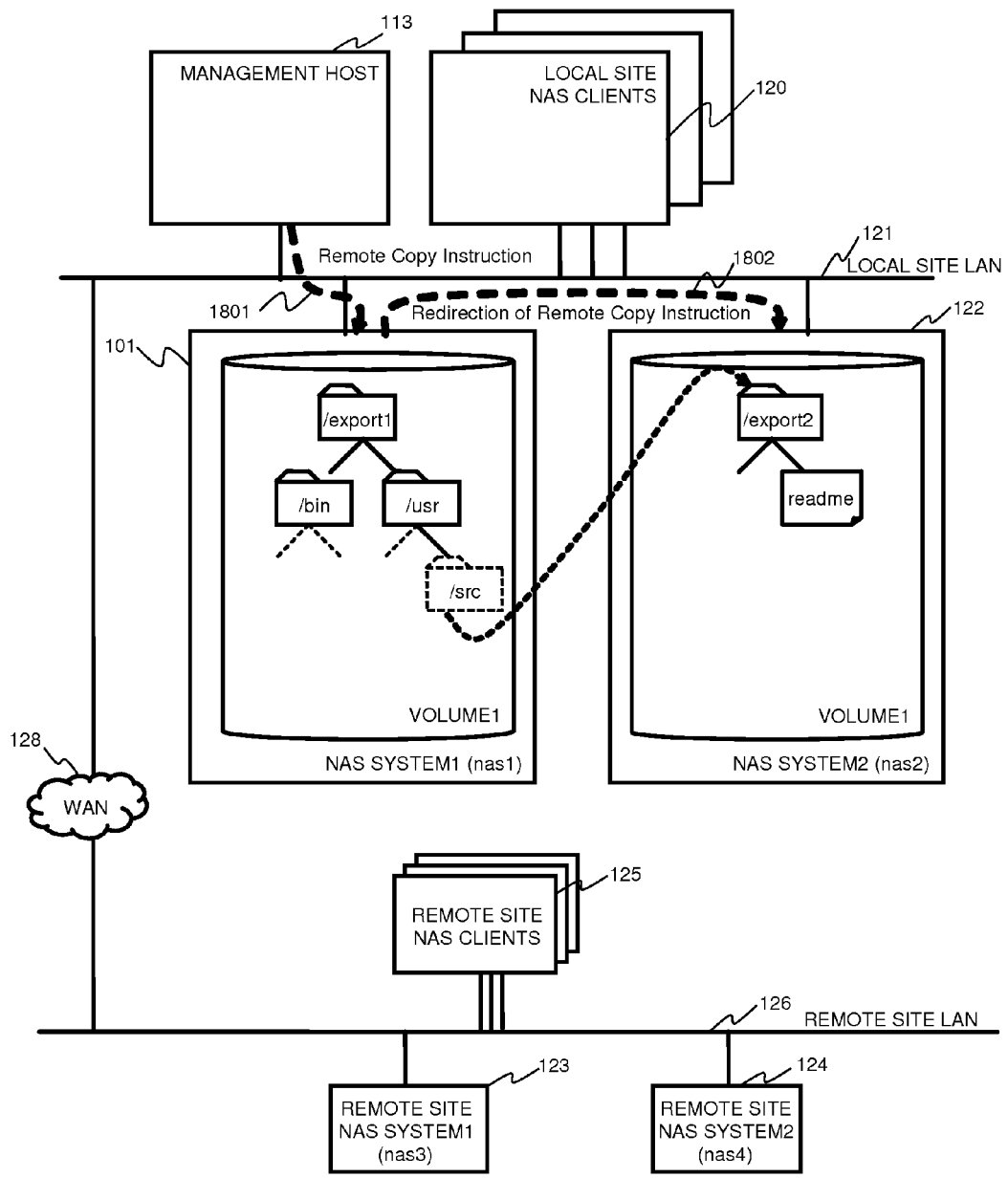
FIG. 18 Instructing to Set Up Remote Copy via Instruction Redirection

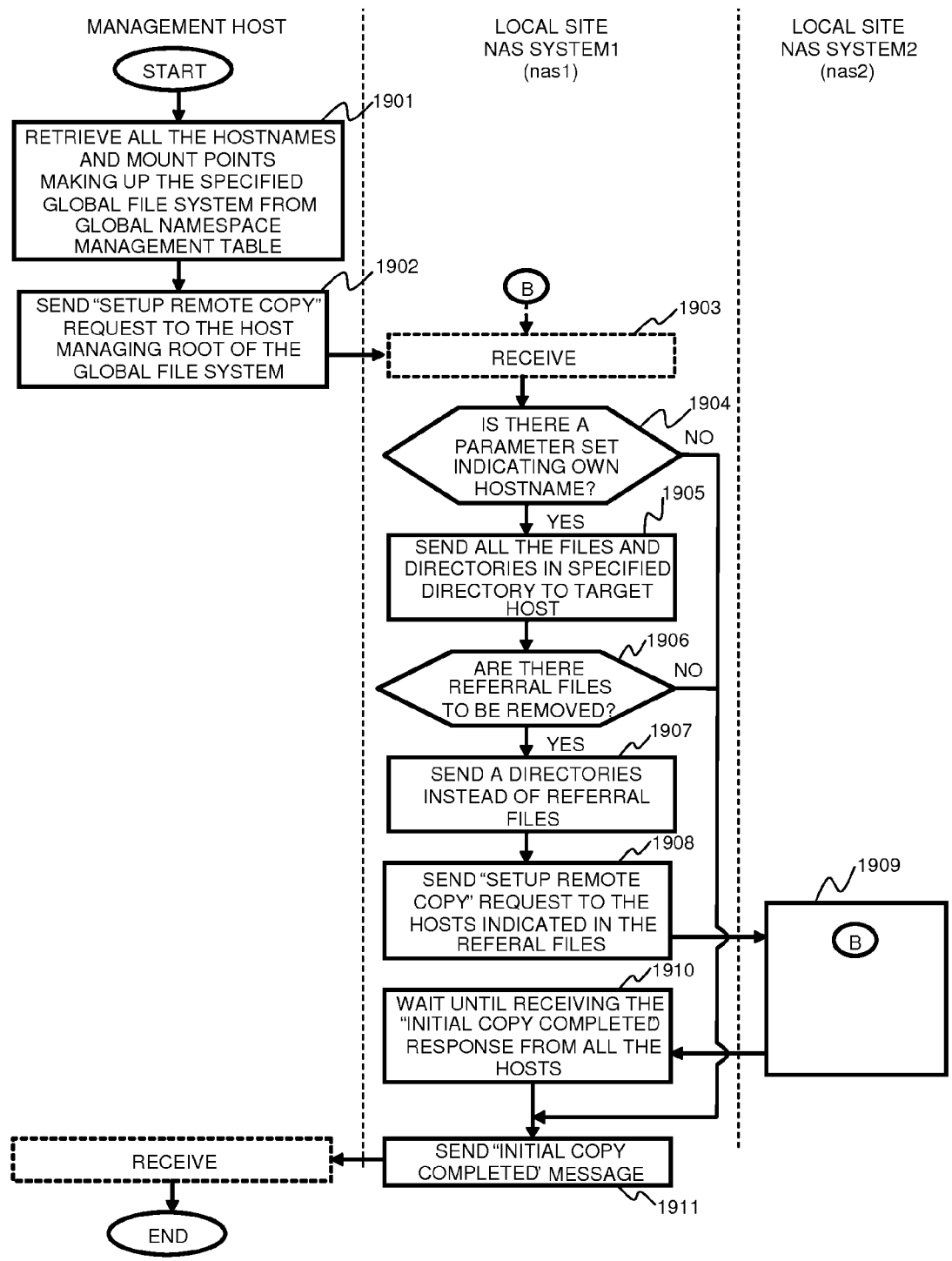
FIG. 19 Flow Diagram of Setting Up Remote Copy via Instruction Redirection for Consolidation

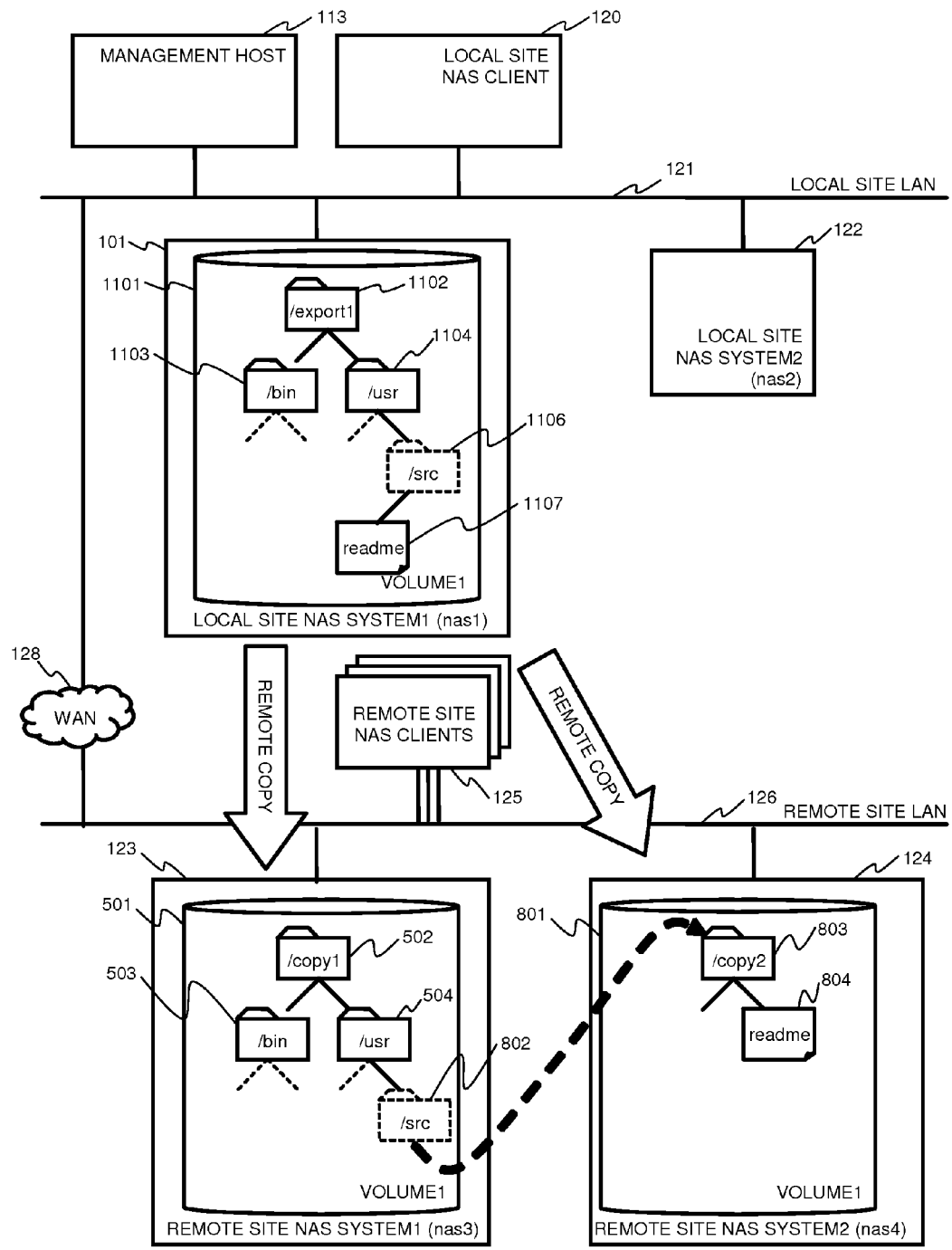
FIG. 20 Splitting a Global File System

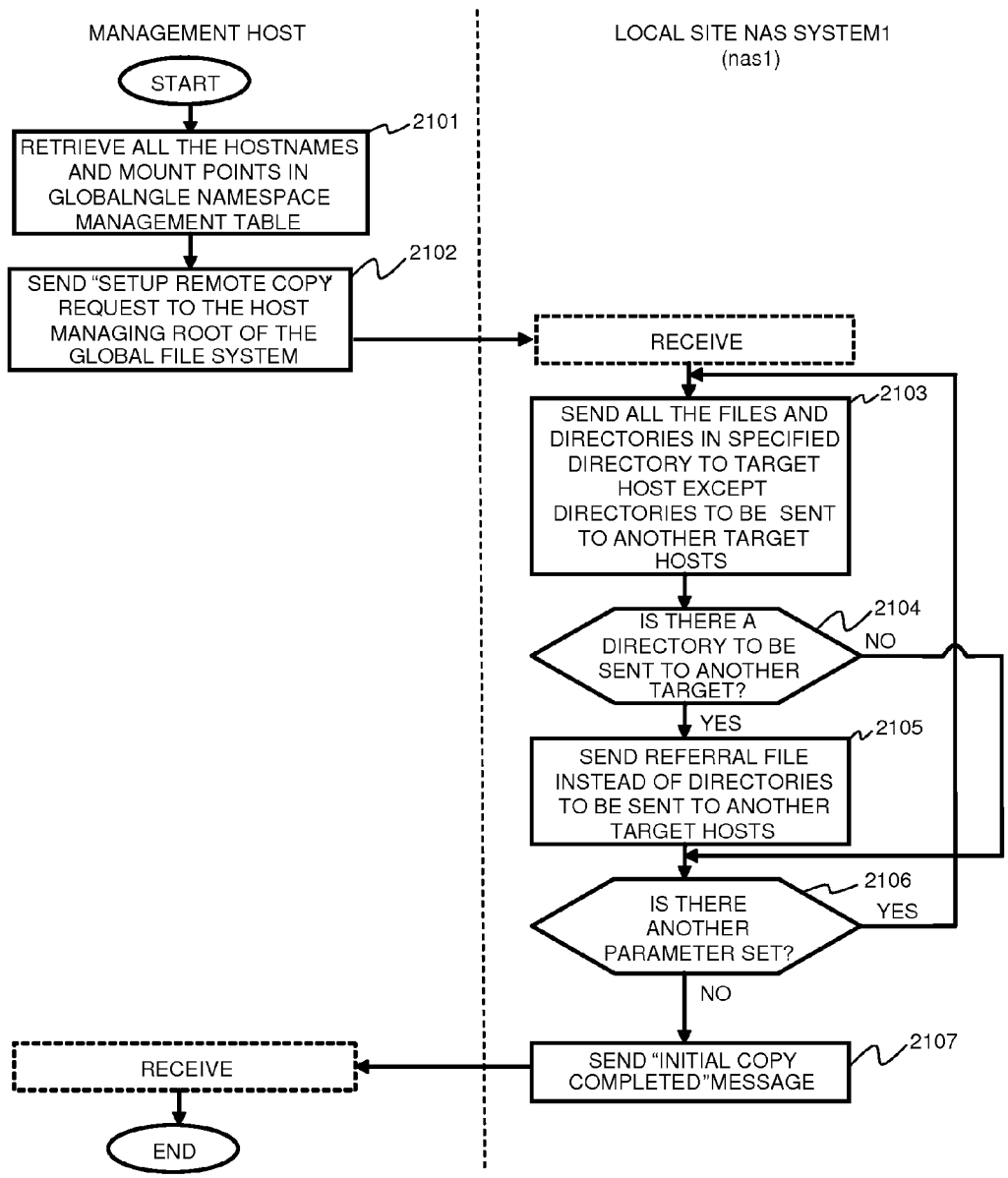
FIG. 21 Flow Diagram of Setting Up Remote Copy for Splitting

| SOURCE DIRECTORY | TARGET HOSTNAME | TARGET DIRECTORY | DIRECTORY TO BE SENT ANOTHER TARGET |
|---|---|---|---|
| /export1 | nas3 | /copy1 | /export1/usr/src |
| /export1/usr/src | nas4 | /copy2 | NULL |

FIG. 22 Information included in SETUP REMOTE COPY request to Local Site NAS Systems for Splitting

| SOURCE HOSTNAME | SOURCE DIRECTORY | TARGET HOSTNAME | TARGET DIRECTORY | REFERRAL FILES TO BE REMOVED |
|---|---|---|---|---|
| nas1 | /export1 | nas3 | /copy1 | /export1/usr/src |
| nas2 | /export2 | nas3 | /copy1/usr/src | NULL |

FIG. 23 Information included in SETUP REMOTE COPY request to Local Site NAS Systems via Instruction Redirection for Consolidation

METHOD OF MIRRORING DATA BETWEEN CLUSTERED NAS SYSTEMS This application is a continuation of U.S. patent application Ser. No. 12/258,500, filed Oct. 27, 2008, which is a continuation of U.S. patent application Ser. No. 11/353,078, filed Feb. 14, 2006 (now U.S. Pat. No. 7,461,222), which is hereby incorporated by reference in its entirety.

BACKGROUND OF THE INVENTION

1. Field of the Invention

The present invention relates to computer storage systems, and, more particularly, to file servers or Network Attached Storage (NAS) systems having NFS version 4 functionality.

2. Description of the Related Art

Historically, to share files with multiple hosts, protocols such as NFS (Network File System) protocol version 2 or 3 have been used. NFS is a distributed file system and associated network protocol originally developed by Sun Microsystem Computer Corporation, although the IETF (Internet Engineering Task Force) is now responsible for the NFS standard.

In previous and current NFS versions 2 and 3, a name space (or directory tree) of a file system is constructed within each server. Therefore, when a file system on a first server is migrated to a new server, clients themselves must change their target to send requests to the new server to access the migrated file system on the new server.

Recently, NFS version 4 has been proposed, and is being developed and implemented on several platforms. In NFS version 4, the name space of a file system can be constructed over multiple servers utilizing referrals. Referrals are the attributes that inform clients of a new location of a file system. When a file system on an old server is migrated to a new server, and when a client attempts to access the file system on the old server, the client is notified of the new location of the file system by a referral so that the client can redirect the access request to the new server. Therefore, clients can access the file system transparently (without being concerned about the new location of the file system) even after the file system is migrated to another server. This feature is called "Global Name Space", and the file system having this feature is called a "Global File System".

Additionally, data replication techniques such as remote copy are often used in storage systems in preparation for situations where the original data is lost or corrupted. Remote copy is a technique to keep a synchronized or asynchronous copy of a file system in a remotely-deployed file server or NAS (Network Attached Storage) system. Conventionally, the remote copy technique is used to copy a file system on a single file server to a single remote file server because each file system can be constructed only within each server.

BRIEF SUMMARY OF THE INVENTION

Under one aspect, the invention provides methods to split a global file system among multiple servers on an occasion when remote copy is performed. Under another aspect, the invention provides methods to consolidate a global file system spread over two or more servers into a single file server on an occasion when remote copy is performed.

In one embodiment, a method of the invention includes consolidating data of a global file system into a single server on an occasion when remote copy is setup. Under the method, when a first NAS system is set up for remote copy with a remotely-deployed NAS system, the NAS system replaces referrals within the global file system with directories, and sends these to the remotely-deployed NAS system. Then, another NAS system making up the global file system sends files and directories under the directories replacing the referrals to the remotely deployed NAS system.

In another embodiment, a method of the invention includes splitting data of a global file system among multiple servers on an occasion when remote copy is set up. Under the method, when a NAS system is set up for remote copy with a remotely deployed NAS system, the NAS system replaces specified directories with referrals, and sends these to the remotely-deployed NAS system. Then, the NAS system sends files and directories under the directories replaced with referrals to a different remotely-deployed NAS system.

Thus, under the invention, on systems having NFS version 4 implemented, a file system on a file server may be split between multiple file servers on the occasion when remote copy is set up so that access load to the file system from clients can be distributed to multiple file servers. Alternatively, a file system distributed over multiple servers may be consolidated into a single remote file server on the occasion when remote copy is set up so that actual data of the file system can be consolidated into a single file server to reduce management and other overhead requirements.

These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 1 illustrates an exemplary configuration of a system in which the methods and apparatus of the invention are applied.

FIG. 2 illustrates an exemplary functional diagram of the system of the invention.

FIG. 3 illustrates how the data needed for the local file system is stored in the volume.

FIG. 4 illustrates the kind of data stored for each inode in the inode table.

FIG. 5 illustrates the logical relationship between inodes and data blocks.

FIG. 6 illustrates an exemplary deployment of files and directories which will be used to describe the embodiments.

FIG. 7 illustrates the operations which the local site NAS client issues to the local site NAS System1 to access the file.

FIG. 8 illustrates an exemplary deployment of files, directories, and referrals which will be used to describe the embodiments.

FIG. 9 illustrates the operations which the local site NAS client issues to local site NAS System1 to access the file "/export1/usr/src/readme".

FIG. 10 illustrates an example implementation of a referral.

FIG. 11 illustrates an example of file system consolidation under the methods of the invention.

FIG. 12 illustrates a global name space management table.

FIG. 13 illustrates a flow diagram that the management host collects information to make the global name space management table from the local site NAS systems.

FIG. 14 illustrates the referral information which each of the local site NAS systems returns to the management host.

FIG. 15 illustrates management host instructions to the local site NAS systems in order to set up remote copy.

FIG. 16 illustrates a flow diagram wherein the management host instructs the local site NAS systems to setup remote copy via instruction by central control.

FIG. 17 illustrates information included in a SETUP REMOTE COPY request to local site NAS Systems via instruction central control.

FIG. 18 illustrates instructing to set up remote copy via instruction redirection.

FIG. 19 illustrates a flow diagram of setting up remote copy via instruction redirection.

FIG. 20 illustrates splitting of a global file system.

FIG. 21 illustrates a flow diagram of setting up remote copy

FIG. 22 illustrates information included in the SETUP REMOTE COPY request to local site NAS systems.

FIG. 23 illustrates information included in the SETUP REMOTE COPY request to local site NAS systems via instruction redirection.

DETAILED DESCRIPTION

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any fashion.

Example System Configuration

FIG. 1 shows an example configuration of a system in which the methods and apparatus in a first embodiment are applied. The system is composed of a plurality of local site NAS systems 101 and 122, one or more remote site NAS systems 123 and 124, a management host 113, one or more local site NAS clients 120, and one or more remote site NAS clients 125. Here, in this embodiment, the remote site NAS system 124 is not necessarily needed.

Each of local site NAS systems 101 and 122 comprises a NAS controller 102 and a storage system 103. NAS controller 102 comprises a CPU 104, a memory 105, a network adapter 106, and a storage adapter 107. These components are connected to each other via a bus 108. Storage system 103 comprises a disk controller 109, a cache memory 110, disk drives 111, and a storage interface 112. These components are connected to each other via a bus 113. NAS controller 102 and storage system 103 are connected to each other via storage adapter 107 and storage interface 112. Here, interfaces such as fibre channel or SCSI may be used for storage interface 112. In those cases, a host bus adapter (HBA) is used for storage adapter 107. Also, storage system 103 may be externally deployed and connected to NAS controller 102 via these interfaces.

Local site NAS systems 101 and 122 are connected to management host 113, local site NAS clients 120, and remote site NAS systems 123 and 124 via network adapter 106. Some of the programs realizing this invention may run on the local site NAS systems 101 and 122 using CPU 104 in NAS controller 102, and may be stored in memory 105 or other type of computer-readable medium.

Each of remote site NAS systems 123 and 124 has the same components as local site NAS systems 101 and 122. Some of the programs realizing this invention run on the remote site NAS systems 123 and 124 using CPU in NAS controller on each remote site NAS system, and may be stored in memory or other type of computer-readable medium.

Management host 113 comprises a CPU 114, a memory 115, a network adapter 116, a storage adapter 117, and a storage system 119. These components are connected to each other via a bus 118. Management host 113 is connected to local site NAS systems 101 and 122 via network adapter 116. Storage system 119 may comprise the same components as storage system 103 in local site NAS systems 101 and 122, and may be externally deployed and connected. Some of the programs realizing this invention may run on management host 113 using CPU 114, and may be stored in memory 115 or other type of computer-readable medium. Each of local site NAS clients 120 and remote site NAS clients 125 comprises the same components as management host 113.

Local site NAS systems 101 and 122, management host 113, and local site NAS clients 120 are connected to each other via local site LAN 121, and remote site NAS systems 123 and 124, and remote site NAS clients 125 are connected to each other via remote site LAN 126. Also, local site LAN 120 and remote site LAN 126 are connected each over via WAN 128 so that local site NAS systems 101 and 122 can transfer data to remote site NAS systems 123 and 124. Local site NAS system1 101 has the hostname "nas1", and local site NAS system2 102 has the hostname "nas2" on the network. Also, remote site NAS system1 123 has the hostname "nas3", and remote site NAS system2 124 has the hostname "nas4" on the network.

Example Functional Diagram

FIG. 2 illustrates an example functional diagram of the system in the first embodiment. In the NAS controller 102 in each of local site NAS systems 101 and 122, and remote site NAS systems 123 and 124, there are an NFSv4 server 201, a remote copy manager 202, a local file system 203, and a volume manager 204. NFSv4 server 201 exports files (makes the files accessible) via NFS version 4 protocol in one or more volumes 205 that local file system 203 mounts. Local file system 203 receives file I/O requests from NFSv4 server 201, and issues appropriate block I/O request to volume manager 204. The one or more volumes 205 include local file system data 206 managed by local file system 203, which will be described further with reference to FIG. 3 below.

Remote copy manager 202 is able to set up a remote copy of a global file system with other NAS systems in accordance with an instruction from management host 113 or other NAS system. Also, remote copy manager 202 may search referrals in file systems in accordance with an instruction from management host 113, and return the referral information to management host 113. Moreover, remote copy manager 202 is able to replace referrals with directories having the same attributes (name, permission, etc.) as referrals, and, to the contrary, replace directories with referrals having the same attributes. Volume manager 204 is able to create one or more volumes 205 using one or more disk drives 111 in storage system 103.

In the management host 113, there is a remote copy instruction module 208. Remote copy instruction module 208 collects referral information from local site NAS systems 101 and 122, and manages a global name space management table 1201 illustrated in FIG. 12, and which will be described in greater detail below. Also, remote copy instruction module 208 instructs local site NAS systems 101 and 122 to set up a remote copy of a global file system with a remote site NAS system 123 or 124.

Global File System and Global Name Space

The global file system is a file system which is constructed over multiple file servers or NAS systems. In the global file system, the name space (or directory tree) of the file system may extend across multiple file servers or NAS systems. The name space which extends over multiple file servers or NAS systems is called global name space. Through use of the global name space feature, clients can access the files and directories without being concerned about the physical location of file servers or NAS systems, even when the files or directories are migrated to another file server or NAS system. In the NFS version 4 protocol, the global namespace feature is actualized by introducing referrals, as will be described in greater detail below.

Local File System Data Structure

The local file system is a file system with which each of the file servers or NAS systems manage files and directories within themselves. Each file server or NAS system can use a different file system. FIG. 3 illustrates how the data 206 needed for local file system 203 is stored in volume 205. A boot sector 301 is usually used to store programs to boot the system if needed. Local file system 203 doesn't change the data in boot sector 301; however, the remainder of the volume 205 may be used by local file system 203.

Local file system 203 may divide the remainder of volume 205 into one or more block groups 302. Each block group 302 contains a super block 303, a block group descriptor 304, a data block bitmap 305, an inode bitmap 306, inode tables 307, and data blocks 308. Super block 303 is used to store the location information of block groups 302. Every block group 302 has the same copy of super block 303. Block group descriptor 304 stores the management information of the block group 302. Data block bitmap 305 shows which data blocks 308 are in use. In a similar manner, inode bitmap 306 shows which inodes 309 in inode table 307 are in use.

FIG. 4 illustrates what kind of data each inode 309 in inode table 307 has. An inode is a persistent data structure in the file system that describes the location of some or all of the disk blocks allocated to a particular file or directory. Thus, each inode 309 stores attributes of each file or directory such as:

inode number 401: the unique number for the inode;
file type 402: what the inode is used for (file, directory, etc);
file size 403: the size of the file;
access permission 404: a bit string expressing access permissions for user (owner), group, or the like;
user ID 405: ID number of the user owning the file;
group ID 406: ID number of the group that the user (owner) belongs to;
create time 407: the time when the file is created;
last modify time 408: the time when the file is modified;
last access time 409: the time when the file is last accessed; and
block pointer 410: pointer to the data blocks where actual data is stored.

FIG. 5 shows the logical relationship between inodes and data blocks. Each inode can be used to indicate a file or a directory. If the inode indicates a file (if its file type field 402 is "file", like inodes 504 and 507 in FIG. 5), the data block pointed from the inode contains actual data of the file. If a file is stored in a plurality of disk blocks 308 (such as ten blocks), the addresses of the ten disk blocks 308 are recorded in block pointer 410. Each block pointer 410 is expressed as the logical block address (LBA) in volume 205. On the other hand, if the inode indicates a directory (if the file type field is "directory", like 501 and 503), the data blocks 308 pointed to from block pointer 410 store the list of inode numbers 401 and names of all files and directories (subdirectories) in the directory. Thus, in FIG. 5, root inode 501 includes a file type 510 of a directory, and includes block pointer 511 that points to data block 502. Data block 502 stores a list of inode numbers such as inode number 32, which identifies "usr" directory inode 503, and inode number 26, which identifies file "hoge" inode 504. File inode 504 includes a block pointer to data block 506 which is the file data of "hoge". Inode 503 includes a block pointer to data block 505, which stores a list of inode numbers including inode 42 which identifies file "gcc" inode 507. File inode 507 includes a block pointer to data block 508, which stores the file data of "gcc".

Accessing a File on a File Server Using NFSv4

FIG. 6 shows an example deployment of files and directories for illustrating how the local site NAS clients 120 access a file in the local site NAS system1 101. In this example, since all the files and directories are located in one local site NAS system1 101, there are no referrals in the file system. In FIG. 6, the file system in volume 601 includes "/export1" root directory 602, "/bin" directory 603, "/usr" directory 604, "/src" directory 605, and "readme" file 606. Thus, file 606 may be identified by its path to the root as "/export1/usr/src/readme".

FIG. 7 illustrates the operations which local site NAS clients 120 issue to local site NAS system1 101 to access file 606 "/export1/usr/src/readme". The NFS version 4 protocol has the clients refer to a file or directory at the server by a "file handle" or "fh". Also, the NFS version 4 protocol has a feature called compound RPC (Remote Procedure Call) which allows the clients to group multiple file operations into a single request to send to the server. In NFS version 4, work is accomplished via operations. An operation is a file system action that forms part of a compound procedure. The server in turn groups the operation replies into a single response. On the server, evaluation proceeds until the first error or last operation whereupon the server returns a reply for all evaluated operations.

In FIG. 7, the contents in parentheses after each operation indicates arguments of the operation provided by the local site NAS client 120, or value returned from the local site NAS system1 101. The first compound procedure 701 issued by local site NAS client 120 contains PUTROOTFH, LOOKUP, GETATTR, and GETFH operations, and is responded to by the local site NAS system1 as indicated at 702.

The PUTROOTFH operation instructs the server (nas1) to set the "current" file handle to the root of the server's file tree. The root file handle is one of the special file handles in the NFS version 4 protocol. The root file handle is the "conceptual" root of the file system name space at the NFS server. The client uses or starts with the root file handle by employing the PUTROOTFH operation. Once this PUTROOTFH operation is used, the client can then traverse the entirety of the server's file tree with the LOOKUP operation.

The LOOKUP operation instructs the server to look up a specified file name or directory name on the server, and return the file handle for the file or the directory.

The GETATTR operation will obtain attributes for the file system object specified by the current file handle such as file type or file size.

The GETFH operation will obtain the current file handle.

Thus, in response to the first compound operation 701 issued by the local site NAS client 120, the local site NAS system1 101 will return the file handle for "/export1" to the client.

A second compound operation 703 is issued by the local site NAS client 120, and contains PUTFH, OPEN, GETFH, and READ operations, and is received and responded to by local site NAS system1 101, as indicated at 704.

The PUTFH operation replaces the current file handle with the file handle provided as an argument of the operation (in this case, the file handle for "/export1" is provided by the client).

The OPEN operation instructs the server to open the file with the file handle provided as an argument of the operation (in this case, the file handle for "/export1/usr/src/readme" is provided).

The READ operation instructs the server to read the file and return the data to the client. Thus, in response to the second compound 703 issued by the local site NAS client 120, the local site NAS system1 101 will return the data in "/export1/usr/src/readme".

Accessing a File in a File System with Referral Using NFSv4

FIG. 8 illustrates an example deployment of files, directories, and referrals for illustrating how the local site NAS clients 120 access a file in the local site NAS system1 101 in the situation where there is a referral in the file system previously described in FIG. 6. In the example of FIG. 8, the files and directories under the directory "/export1/usr/src" 605 (FIG. 6) on the local site NAS system1 101 have been migrated to "/export2" 803 on the local site NAS system2 122, and "/export1/usr/src" 605 now has been replaced on local site NAS system1 101 with a referral 802. To express the referral information showing that the files and directories are migrated to "/export2" 803 on the local site NAS system2 122 (its hostname being "nas2"), thus the expression is "nas2:/export2". Similarly, the "readme" file 804 on local site NAS system2 122 would be expressed as "nas2:/export2/readme".

FIG. 9 shows the operations which local site NAS clients 120 issue to local site NAS system1 101 to access the file "/export1/usr/src/readme". The first compound operation 901 issued by the local NAS client 120 and response 902 from the local site NAS system1 to the compound 902 are the same as compound operations 701 and 702 in the example shown in FIG. 7. In response to the compound operation 903, the local site NAS system1 101 in operation 904 will return the error code "NFS4ERR_MOVED" because "/export1/usr/src" is no longer located in the local site NAS system1 101, and the open operation for "/export1/usr/src/readme" will fail.

After receiving the error code "NFS4ERR_MOVED", the local site NAS client 120 will issue another compound operation procedure 905 to determine under which directory the file has been migrated. In response to the compound operation 905, the local site NAS system1 101 will return "NFS4ERR_MOVED" again. However, this time, in response to the GETATTR operation for "/export1/usr/src", the local site NAS system1 101 returns "fs_locations". The "fs_locations" is a structure containing the referral information. In this case, the "fs_locations" contains the referral information "nas2:/export2". In reference to this information, the local site NAS client 120 can determine to which location it has to redirect the operations. In this case, the local site NAS client 120 can determine from the referral information that the desired file is located in "nas2:/export2". Therefore, the local site NAS client 120 issues another compound operation 907 to obtain the file handle for "export2", which is returned in operation 908. Then, the local site NAS client 120 issues operation 909 to access the file "/export2/readme" on the local site NAS system2 122, and operation 910 by local site NAS system2 122 returns the data of "readme" to NAS client 120.

Example Implementation of Referral

FIG. 10 illustrates an example implementation of a referral within a file system. In this example, the referral is implemented as a referral file. Also, the example shows the case where the file system (or files and directories) under the directory "src" are migrated to local site NAS system2 122, as illustrated in FIG. 8. Thus, FIG. 10 illustrates a root directory inode 1001 that includes a block pointer that points to data block 1002. Data block 1002 identifies the inode 1003 as a directory inode named "usr" having an inode number 32. Inode 1003 includes a block pointer that points to data block 1004, which includes information on the directory "src" having an inode number of 68. However, rather than containing information regarding the actual directory "src" inode, the inode information for directory "src" has been replaced with referral inode 1005. In the inode for referral files, the file type field 402 indicates "referral" as illustrated in inode 1005. The data blocks 1006 pointed to from block pointer 410 in inode 1005 store a list of new locations of directory "src" which includes a target 1007 and a path 1008. Target 1007 indicates the hostname of the NAS system which the file system or files and directories under the directory "src" have been migrated to, which in this case is "nas2". The path 1008 indicates the path to the directory in which the migrated data is stored within the new NAS system nas2. In this example, the row 1009 indicates the files and directories under "src" have been migrated to ":/export2".

Remote Copy

Remote copy is a mechanism to keep a synchronous or asynchronous copy of a file system on a remotely-deployed file server or NAS system. In the remote copy mechanism, a primary file server that has the original file system (or source file system) is associated with a secondary server that the original file system will be copied to. After the association is set, all or specified files and directories in the original file system on the primary file server are copied to the secondary file server. This process is called the "initial copy". After the initial copy is completed, all the write I/Os to the original file system on the primary file server are sent to the secondary file server, and applied to the copied file system on the secondary file server so that the copy of the file system remains synchronized with the original file system. This process is called the "update copy".

There are various methods to implement remote copy mechanisms. Server-based file remote copy is one of the popular implementations of the remote copy mechanism. An example of a server-based file remote copy is a method to perform remote copy functions on the NAS controller of the NAS system. In this method, the file system on the NAS controller transfers all the write I/O's applied to the original file system on the primary file server to the remotely deployed NAS system via a WAN (wide area network), or the like.

Consolidation of File Systems

FIG. 11 shows an example of consolidation of file systems under one embodiment of the invention. In the local site, the global file system is constructed over the local site NAS system1 101 and the local site NAS system2 122, as described previously with reference to FIGS. 8 and 10. Under the invention, data of the global file system is consolidated into the remote site NAS system1 123 (nas3) on the occasion when remote copy is set up between each of the local site NAS systems 101, 122 and remote site NAS system1 123. The invention makes this possible by use of referrals and remote copy commands, so that, rather than merely creating identical copies of the file system on two remote NAS systems, this embodiment of the invention enables remote copy to be made to a single consolidated file system on a single remote NAS system, thereby reducing management overhead, equipment requirements, and the like.

Global Name Space Management Table

The management host 113 instructs the local site NAS systems 101 and 122 to perform remote copy of the global file system constructed over the local site NAS systems. To determine which NAS system is to be instructed to set up remote copy to maintain all the name space of the global file system, the management host 113 manages and refers to the global name space management table 1201 illustrated in FIG. 12. The global name space management table 1201 shows what local site NAS systems form the global file system. Columns of table 1201 include the name of the global name space 1202, path in the global name space 1203, target 1204, and path 1205. The name of global name space 1202 is an arbitrary name for the global name space which may be named and input by an administrative user. The target 1204 indicates the hostname of the local site NAS system server which manages the part of the global name space, and the path 1205 shows the local path (mount point) within the local site NAS system managing that part.

Row 1206 and 1207 of table 1201 shows the situation illustrated in FIG. 11. The row 1205 indicates that the "/" (root) of the global name space is managed by the local site NAS system1 101 having the hostname "nas1", and its local path on the local site NAS system1 101 is "/export1". The row 1207 indicates that the files and directories under "/usr/src" within the global name space are managed by the local site NAS system2 122 having the hostname "nas2", and that the local path on the local site NAS system2 122 is "/export2".

Collecting Information Needed for Global Name Space Management Table

FIG. 13 shows the flow diagram of a procedure that may be carried out by the management host 113 for collecting information to create the global name space management table 1201 from the local site NAS systems 101 and 122.

Step 1301: the management host 113 broadcasts a referral information request to all the local site NAS systems 101 and 122, which directs each local NAS system to determine if it has any referrals present.

Step 1302: after receiving the referral information request from the management host 113, each of the local site NAS systems 101 and 122 searches for referrals within all the file systems exported by each, respectively.

Step 1303: each of the local site NAS systems 101 and 122 determines whether the results of the search produced any referral files.

Step 1304: if the local site NAS system does not find any referral files in the file systems exported by itself, it sets NULL as the referral information.

Step 1305: if the local site NAS system finds referral files in the file systems exported by itself, the local site NAS system retrieves referral information from the referral files.

Step 1306: the local site NAS system returns the referral information to the management host 113.

Step 1307: after receiving the referral information from all the local site NAS systems 101 and 122, the management host 113 creates the global name space management table 1201.

FIG. 14 illustrates the referral information 1401 which each of the local site NAS systems 101 and 122 returns to the management host 113. Each of the local site NAS systems 101 and 122 returns its own hostname 1402, local exported directory 1403, local location of referral file 1404, target hostname that the referral file indicates 1405, and the target path in the target host that referral file indicates 1406. Row 1407 shows the referral information which the local site NAS system1 101 (nas1) returns to the management host 113 in the situation of FIGS. 8, 10 and 11. Since the local site NAS system1 101 has the referral file 802 in its file system as shown in FIGS. 8 and 11, NAS system1 101 retrieves the referral information from the referral file and returns the information to the management host 113. On the other hand, as shown in row 1408, since the local site NAS system2 122 does not have any referral files in its file systems, local site NAS system2 122 returns the referral information filled with NULL except for its own hostname nas2 at 1402 and its local exported directory "/export2" at 1403. From the referral information returned from the local site NAS systems 101 and 122, the management host 113 can determine that the local site NAS system1 101 manages the root (/) of the global file system because any other referral information indicates the local exported directory in the local site NAS system1 101.

Setting Up Remote Copy

The global file system to be copied by remote copy is specified by an administrative user on management host 113 using the name of the global name space 1202. Also, the target host and directory to which the global file system should be copied to are specified by the administrative user. After the administrative user specifies the name of the global name space and target host/directory on the management host 113, the management host 113 instructs the local site NAS systems 101 and 122 to set up remote copy while consolidating the global file system. Thus, a first portion of the file system on a first NAS system and a second portion of the file system on a second NAS system are copied and consolidated onto a third NAS system on the occasion when remote copy is set up and executed. The remote copy must be set up on all the local site NAS systems 101 and 122 constituting the global file system in order to maintain all the name space. Therefore, a method to instruct all the local site NAS systems is needed. Two possible methods include (1) instruction by central control, and (2) instruction redirection.

Consolidation—Instruction by Central Control

Under the first method, instruction by central control, the management host 113 itself instructs all the local site NAS systems 101 and 122 in order to set up remote copy as illustrated in FIG. 15. In FIG. 15, a first arrow 1501 indicates remote copy/consolidation instructions set from the management host 113 to local site NAS system1 101. A second arrow 1502 indicates remote copy/consolidation instructions sent by management host 113 to local site NAS system2 122 after local site NAS system 1 101 has completed initial copy.

FIG. 16 shows a flow diagram of a process that the management host 113 follows to instruct the local site NAS systems 101 and 122 to setup remote copy via instruction by central control.

Step 1601: the management host 113 retrieves all the hostnames and the paths making up the global file system from the global name space management table 1201.

Step 1602: the management host 113 sends a SETUP REMOTE COPY request to the local site NAS system managing the root (/) of the global file system whose hostname was found in the global name space management table 1201 in step 1601. The SETUP REMOTE COPY request includes information shown in table 1701 in FIG. 17. For local site NAS system1 101, the request includes the parameters shown in the row 1706 in FIG. 17, while for local site NAS system2 122, the request includes the parameters shown in row 1707. Column 1702 (local source directory) specifies which local directory on the local site NAS system should be copied. Column 1703 (target hostname) specifies which remote site NAS system the local directory is copied to. Column 1704 (target directory) specifies which directory on the target remote site NAS system the local directory is copied to. Column 1705 (referral files to be removed) specifies the referral files which must be replaced with directories having the same attributes as the referral files during the consolidation process. If there are multiple referral files to be removed, multiple paths to the referral files are specified in this column.

Step 1604: after receiving the SETUP REMOTE COPY request (step 1603) from the management host 113, the local site NAS system having the root (/) of the global file system (in this case, the local site NAS system1 101) sends all the files and directories to the specified remote site NAS system (in this case, the remote site NAS system1 123).

Step 1605: the local site NAS system1 101 makes a check whether any referral files to be removed are specified in the SETUP REMOTE COPY request. If there are no referral files specified, then it proceeds to step 1607.

Step 1606: if there are referral files specified to be removed, then local site NAS system1 101 sends directories having the same attributes (name, permission, etc.) as the referral files to the target host (in this case, remote site NAS system2 123). In response to that, the remote site NAS system1 123 will overwrite the referral files with the directories.

Step 1607: the local site NAS system1 101 sends the initial copy completed message to the management host 113.

Step 1608: the management host 113 checks whether there is another local site NAS system constructing the global file system. If no, the process is done.

Step 1609: if there is another local site NAS system constructing the global file system, the management host 113 sends the SETUP REMOTE COPY request to the other local site NAS system (as represented by arrow 1502 in FIG. 15). In this case, the local site NAS system2 122 receives the request. In this request, the parameters shown in the row 1707 in FIG. 17 are included.

Step 1610: after receiving the request, the local site NAS system2 122 processes the same steps described above from step 1604 to step 1607. Once the last local site NAS system sends the Initial Copy Completed message, the process ends, and the entire global file system will have been consolidated on the target host. Further, while the example consolidates a global file system spread over only two local NAS systems, it will be apparent that the invention may be used to consolidate file systems from any number of local NAS systems, or the like.

Consolidation—Instruction Redirection

The second method of instructing consolidation by remote copy instruction comprises instruction redirection, wherein the management host 113 instructs only the local site NAS system having the root (/) of the global file system (in this case, the local site NAS system1 101) to initiate remote copy. Then the local site NAS system1 101 redirects the instruction to the other local site NAS system which the referral in the local site NAS system indicates. The second method is illustrated in FIG. 18, wherein a first arrow 1801 indicates a remote copy/consolidation instruction from management host to local site NAS system1 101. Then, local site NAS system1 101 redirects the remote copy/consolidation instruction to other NAS systems for which local site NAS system1 101 has referral files, as indicated by second arrow 1802.

FIG. 19 shows the flow diagram that illustrates the process in which the management host 113 instructs the local site NAS systems to set up remote copy and consolidate the file system via instruction redirection to achieve the result illustrated by FIG. 11.

Step 1901: the management host 113 retrieves all the hostnames and the paths that make up or form a part of the global file system from the global name space management table 1201.

Step 1902: the management host 113 sends the SETUP REMOTE COPY request to the host managing the root (/) of the global file system whose hostname were found in the global name space management table 1201 in step 1901. The request includes information shown in table 2301 in FIG. 23. Column 2302 (source hostname) specifies the hostname of the local site NAS system to which the following parameters should be applied. Column 2303 (local source directory) specifies which local directory on the local site NAS system should be copied. Column 2304 (target hostname) specifies which remote site NAS system the local directory is copied to. Column 2305 (target directory) specifies which directory on the target remote site NAS system the local directory is copied to. Column 2306 (referral files to be removed) specifies the referral files which must be replaced with directories having the same attributes as the referral files. If there are multiple referral files to be removed, multiple paths to the referral files are specified in this column. Thus, the local NAS system1 101 makes use of the information in row 2307 of table 2301.

Step 1904: after receiving the SETUP REMOTE COPY request from the management host 113 (step 1903), the local site NAS system checks whether the parameter set for itself is included in the parameters in the SETUP REMOTE COPY request by comparing its own hostname and the source hostname column 2302 in the parameters. In this case, local NAS system1 101 finds the row 2307 having the name "nas1". If a local NAS system finds no parameter set for itself, then the process proceeds to step 1911.

Step 1905: the local site NAS system having the root (/) of the global file system (in this case, the local site NAS system1 101) sends all the files and directories to the specified remote site NAS system (in this case, the remote site NAS system1 123) as specified in the parameter set for itself.

Step 1906: the local site NAS system1 101 makes a check as to whether any referral files to be removed are specified in the parameter set for itself. If there are no referral files specified, then the process proceeds to step 1911.

Step 1907: if there are referral files specified to be removed, then the local site NAS system1 101 sends directories having the same attributes (name, permission, etc.) as the referral files to the target remote site NAS system (in this case, remote site NAS system1 123). In response to that, the remote site NAS system1 123 overwrites the referral files with the directories.

Step 1908: the local site NAS system1 101 sends or redirects the "SETUP REMOTE COPY" request to the local site NAS systems indicated in the referral files to be removed as target 1007 (see FIG. 10). In this case, the local site NAS system2 122 receives the request. In the request, the parameters shown in the row 2308 in FIG. 23 are specified, while the parameter set for the sending NAS system, local site NAS system1 101, is removed.

Step 1909: the local site NAS system2 122 processes the same steps from step 1903 to step 1911. This process may be carried out recursively for any number of NAS systems, depending on the extent and structure of the global file system.

Step 1910: the local site NAS system1 101 waits until receiving the "INITIAL COPY COMPLETED" message from all the local site NAS systems to which it sends the "SETUP REMOTE COPY" request in step 1908.

Step 1911: the local site NAS system1 101 sends "INITIAL COPY COMPLETED" message to the management host 113. Thus, the entire global file system has been copied and consolidated into a single remote NAS system location, as indicated in FIG. 15, and this location will be the object of the remote copy function for future I/O operations on the original file system.

Splitting the File System

Under an additional embodiment of the invention, the invention may be used to split a file system among two or more remote NAS systems, i.e., the file tree is divided on the occasion when remote copy is set up and executed so that one portion of the file system copy including the root is located on a first NAS system and a second portion of the file system including one or more directories and files is located on a second NAS system. Under this embodiment, the system configuration is the same as previous embodiment described in FIG. 1. The system is composed of one or more local site NAS systems 101 and 122, a plurality of remote site NAS systems 123 and 124, a management host 113, one or more local site NAS clients 120, and one or more remote site NAS clients 125. Here, in this embodiment, the local site NAS system 122 is not necessarily needed. Additionally, the functional diagram is the same as the embodiment described in FIG. 2. FIG. 20 shows an example which illustrates the results achieved by splitting a global file system through use of remote copy commands. In the local site, the file system is constructed within a single local site NAS system1 101. In FIG. 20, copy data of the file system is split between remote site NAS system1 123 and remote site NAS system2 124 on the occasion when remote copy is set up between the local site NAS system 101 and each of the remote site NAS systems 123 and 124. This may be desirable in some circumstances, such as to reduce the access load on a particular remote NAS system, to enable to the use of smaller capacity remote systems, or the like.

The management host 113 manages the same global file system name space management table 1201 as the embodiment described in FIG. 12. Further, the flow diagram for this embodiment is the same as for the embodiment described in FIG. 13. Thus, no additional explanation of these portions of this embodiment is necessary.

Setting up Remote Copy While Splitting

The global file system to be copied is specified by an administrative user on management host 113 using the name of the global name space 1202. Also, the target host and directory in which the global file system should be copied to are specified by the administrative user. Moreover, the administrative user specifies under which directory the global file system should be split (copied) to, its target host, and its target directory. After the administrative user specifies these on the management host 113, the management host 113 instructs the local site NAS system 101 to setup remote copy of the global file system while splitting the global file system.

FIG. 21 shows a flow diagram illustrating the process wherein the management host 113 instructs the local site NAS system 101 to set up remote copy while splitting the file system.

Step 2101: the management host 113 retrieves all the hostnames and the paths constructing the global file system from the global name space management table 1201.

Step 2102: the management host 113 sends SETUP REMOTE COPY request to the host managing the root (/) of the global file system whose hostname were found in the global name space management table 1201 in step 2101. The request includes the parameters shown in rows 2206 and 2207 in table 2201 in FIG. 22. In table 2201, column 2202 contains the source directory, column 2203 contains the target host name in which each source directory will be copied, column 2204 indicates the name of the target directory, and column 2205 indicates the directory that will be sent to another target.

Step 2103: after receiving the SETUP REMOTE COPY request from the management host 113, the local site NAS system (in this case, the local site NAS system1 101) sends all the files and directories to the specified remote site NAS system (in this case, the remote site NAS system1 123) except for the directories specified as directories to be sent to another target host 2205 as specified as the first parameter set (in this case, row 2206).

Step 2104: the local site NAS system1 101 checks whether directories to be sent to another target are specified in the first parameter set (column 2205). If there are no directories specified, then it proceeds to step 2106.

Step 2105: if there are directories to be sent to another target, the local site NAS system1 101 sends a referral file instead of the directory to the specified remote site NAS system1 123. The referral file sent by the local NAS system1 101 has the same attributes (name, permission, etc.) as the original directory, and has referral information to the new target (in this case, "nas4:/copy2" as set forth in row 2207 of table 2201). In response to that, the remote site NAS system1 123 overwrites the original directory "src" with the referral file.

Step 2106: the local site NAS system1 101 checks whether there is another parameter set in the parameters included in the SETUP REMOTE COPY request from the management host 113. In this case, there is another parameter set (row 2207). So, the local site NAS system1 goes back to step 2103 using the next parameter set (row 2207). However, this time, when step 2104 is reached, column 2205 of row 2207 indicates a NULL, so that no referral file is sent, and the process proceeds to steps 2106 and 2107.

Step 2107: the local site NAS system1 101 sends "INITIAL COPY COMPLETED" message to the management host 113. This indicates that the file system has been copied and split in the manner illustrated in FIG. 20, and that the remote NAS systems 123, 124 are set up as the objects of remote copy from the file system on local site NAS system1 101.

From the foregoing description, it will be apparent that this invention teaches systems and methods for managing file systems on file servers or NAS systems having NFS version 4 functionality. Thus, under the invention, copy data of a file system constructed over multiple file servers using NFS version 4 protocol may be consolidated on the occasion when remote copy is set up. Alternatively the copy data of a file system constructed on a single file server may be split among multiple servers when remote copy is set up. Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of splitting a copy stored in a plurality of storage systems in a system, the system comprising:
a first storage system storing a data,
a second storage system;
a third storage system; and
a management computer containing a management information managing the first, second and third storage systems forming the system, the method comprising the steps of:
sending a first instruction from the management computer to the first storage system instructing the first storage system to copy the data to the second storage system,
checking if the data contains a referral information targeting to the third storage system,
sending a first part of the data, except for a second part of the data to which the third storage system is targeted, to the second storage system from the first storage system,
sending, from the first storage system to the second storage system, a referral information instead of the second part of the data, if the data contains the referral information, and
sending, from the first storage system to the third storage system, the second part of the data to which the third storage system is targeted.

2. The method of claim 1, wherein the second storage system overwrites the original data with the referral information.

3. The method of claim 1, wherein the data is split to the first part of the data in the first storage system and the second part of the data in the second storage system.

4. The method of claim 1, wherein the first instruction includes information which identifies a source directory, target storage system, target directory of the target storage system and the referral information of a data to be sent to another target storage system.

5. The method of claim 1, wherein checking if the data contains a referral information targeting to the third storage system comprises checking the referral information of a data to be sent to another target storage system in the information included in the first instruction 6. The method of claim 1, wherein the first instruction includes information which identifies a source directory, target hostname, target directory and the referral information of a data to be sent to another target.

7. The method of claim 1, wherein the referral information includes information identifying the second part of the data and a path of one or more directories and data stored on the first storage system.

8. The method of claim 1, wherein the management information includes a hostname and a path of the first, second and third storage systems which manages a part of the system.

9. The method of claim 8, further comprising the step of:
referring to the management table to determine which of the first, second and third storage systems is to be instructed by the management computer to copy data.

10. A storage system consolidating splitting a copy stored in a plurality of storage systems, the system comprising:
a first storage system storing a data,
a second storage system;
a third storage system; and
a management computer containing a management information managing the first, second and third storage systems forming the system,
wherein the management computer includes:
a first sender which sends a first instruction from the management computer to the first storage system instructing the first storage system to copy the data to the second storage system,
wherein the first storage system includes:
a checker which checks if the data contains a referral information targeting to the third storage system,
a second sender which sends a first part of the data, except for a second part of the data to which the third storage system is targeted, to the second storage system from the first storage system,
the second sender which sends, from the first storage system to the second storage system, a referral information instead of the second part of the data, if the data contains the referral information, and
the second sender which sends, from the first storage system to the third storage system, the second part of the data to which the third storage system is targeted.

11. The storage system of claim 10, wherein the second storage system overwrites the original data with the referral information.

12. The storage system of claim 10, wherein the data is split to the first part of the data in the first storage system and the second part of the data in the second storage system.

13. The storage system of claim 10, wherein the first instruction includes information which identifies a source directory, target storage system, target directory of the target storage system and the referral information of a data to be sent to another target storage system.

14. The storage system of claim 10, the checker checks if the data contains a referral information targeting to the third storage system by checking the referral information of a data to be sent to another target storage system in the information included in the first instruction.

15. The storage system of claim 10, wherein the first instruction includes information which identifies a source directory, target hostname, target directory and the referral information of a data to be sent to another target.

16. The storage system of claim 10, wherein the referral information includes information identifying the second part of the data and a path of one or more directories and data stored on the first storage system.

17. The storage system of claim 10, wherein the management information includes a hostname and a path of the first, second and third storage systems which manages a part of the system.

18. The storage system of claim 17, wherein the management computer refers to the management table to determine which of the first, second and third storage systems is to be instructed to copy data.

* * * * *